Patented Feb. 21, 1950

2,498,621

UNITED STATES PATENT OFFICE 2,498,621

POROUS COMPOSITIONS OF MATTER AND THEIR PREPARATION

Edward L. Kropa, Old Greenwich, Conn., Louis E. Craig, Easton, Pa., and Arthur S. Nyquist, Cos Cob, Conn., assignors to American Cyanamid Company, New York, N. Y., a corporation of Maine No Drawing. Application December 4, 1948, Serial No. 63,632

10 Claims. (Cl. 260—2.5)

This invention relates to resinous compositions. More particularly, it relates to substantially water-insoluble, expanded, porous resins and to a process of preparing them.

In many applications, such as for example in the aircraft industry, a structural material combining both lightness and strength is desirable. A resin which cures by polymerization has most suitable mechanical, electrical, physical and thermal properties, so we have attempted to produce a porous and consequently light weight polymerized material which retains its strength and other excellent properties in spite of its porosity.

Several methods attempted have been unsuccessful. To prepare expanded materials by mechanical means, an unsaturated polymerizable material was intimately mixed with a gas by means of a high speed mixer and then gelled. It was found, however, that the gels were not sufficiently stable at the temperature necessary to effect a cure. Another method consisted in applying a gas which is absorbed or adsorbed by a particular unsaturated polymerizable material to that material at elevated pressure. When the pressure is released, the absorbed or adsorbed gas should expand the polymerizable material which might then be set in the expanded condition. However, we have found that in general the polymerizable material does not retain the gas to any great extent.

The present invention takes advantage of the fact that in the initial stage, the polymerizable material is liquid. It is therefore possible to readily introduce a gas-liberating material into the liquid. On subsequent heating the gas-liberating substance is decomposed, the resin sets, and the gas is entrapped in the cured mass.

It is therefore an object of the present invention to produce porous cured resins.

It is another object of the present invention to produce light weight resinous materials of high strength.

A further object of the present invention is to produce an expanded, porous resin by chemical means.

Still another object of the present invention is to provide an expanded plastic material of low density suitable for use as an interlayer in fabricated light-weight structural material.

These and other objects are attained by heat-curing a mixture including a polymerizable unsaturated alkyd resin, a liquid having a boiling point of at least 100° C. and containing a $CH_2=C<$ group, and a gas-liberating material. A polymerization inhibitor and/or polymerization catalyst may be added to the polymerizable mixture if desired.

The following examples, the proportions of which are given in parts by weight, are merely illustrative. It is not intended that they should be construed as limiting the scope of the invention to the specific details set forth.

Example 1

A polymerizable composition is prepared by bringing together two parts of an alkyd resin prepared by heating 6.3 mols diethylene glycol, 5 mols fumaric acid and 1 mol sebacic acid at about 170° C. to an acid number of about 50 and one part of styrene, 0.1% by weight of hydroquinone and .004% by weight of cobalt added as cobalt naphthenate, are added to the mixture in accordance with the procedural details set out in U. S. applications Serial No. 556,082 filed September 27, 1944, now abandoned, and Serial No. 555,194, filed September 21, 1944, now Patent No. 2,443,741, issued June 22, 1948. To this solution 0.5% of benzoyl peroxide is added. 1.0 part of the diguanylurea salt of diazotized toluidine is dispersed in 200 parts of the above described polymerizable composition, and the resin solution so obtained is cured by heating at 140° C. for about 20 minutes.

As the diguanylurea salt of diazotized toluidine undergoes thermal decompositions, the resin solution gels. The continued evolution of gas due to diazo decomposition results in some of the gas being trapped in the gelled resin mass, thereby effecting a volume expansion of about 10–15%. The cured resin mass is soft and porous.

Example 2

To a series of four 100-part portions of the polymerizable composition of Example 1 are added, respectively, 0.5, 1, 2 and 5 parts of powdered ammonium bicarbonate.

The resin solutions are cured by heating at 100° C. for an hour. Volume expansions for the cured porous resins obtained are as follows:

| Per Cent Bicarbonate Added | Per Cent Volume Expansion |
|---|---|
| 0.5 | 75 |
| 1 | 117 |
| 2 | 131 |
| 5 | 234 |

Example 3

0.9 part of ammonium carbonate is dispersed in 90 parts of a resin solution consisting of 45 parts of an alkyd resin made from 4 mols ethylene glycol, 3 mols sebacic acid, 1 mol fumaric acid and 45 parts of styrene.

The resin solution is cured by heating at 100° C. for an hour during which operation it undergoes a volume expansion of approximately 50%. The resulting porous mass is soft and spongy.

Example 4

10 parts of finely powdered para-isopropenyl toluene polymer is added to 50 parts of the polymerizable resin composition described in Example 1. The mixture is stirred in the presence of powdered Dry Ice until the viscous mass is of smooth creamy consistency, numerous small bubbles of evolved carbon dioxide gas having been entrapped thereby.

1 part of very fine short glass fibers is added and dispersed by stirring with additional powdered Dry Ice until the dough-like mass is of uniform consistency.

The resulting mixture, when heated at 140° C. for an hour, undergoes a volume increase due to the expansion of the entrapped carbon dioxide and cures to a hard, porous mass of very good strength.

Example 5

1.5 parts of fine, short glass fibers and about 5 parts of powdered Dry Ice are added to 150 parts of the polymerizable composition of Example 1 containing 0.75 part of lauroyl peroxide in place of the benzoyl peroxide. The mixture is stirred thoroughly to disperse the glass fibers and entrap some of the carbon dioxide gas liberated as the Dry Ice decomposes.

A ¼-inch thick sheet of the resulting mixture is cast and cured by permitting it to stand at 20° C. for about 16 hours and then heating it for 2 hours at 100° C. The cast sheet has a density of approximately 0.68, indicating a fairly good degree of porosity, and a dielectric constant of 2.8 at $10^6$ cycles.

Example 6

7.5 parts of powdered ammonium bicarbonate are added to and well dispersed in 750 parts of the polymerizable composition of Example 1 containing 3.75 parts of lauroyl peroxide instead of benzoyl peroxide.

Upon curing by heating at 100° C. for an hour in an open vessel, the resin undergoes a volume expansion of approximately 140% to give a fairly hard, porous mass.

Example 7

A polymerizable composition is prepared by bringing together 10 parts of diallyl phthalate, 15 parts of an alkyd resin prepared from 6 mols of diethylene glycol, 5 mols of fumaric acid, and 1 mol of sebacic acid, and 0.1–0.2 part benzoyl peroxide. 1 part ammonium bicarbonate is dispersed in 100 parts of the above composition and the resin is cured by heating at 100° C. for an hour, undergoing in the process a volume expansion of 80%.

Example 8

A mixture of 20 parts of the alkyd resin prepared from 6 mols diethylene glycol, 5 mols fumaric acid and 1 mol sebacic acid, 10 parts bis allyl lactocarbonate and 0.15 part benzoyl peroxide is prepared. To 90 parts of this mixture is added 9 parts of ammonium bicarbonate. During curing by heating at 100° C. for an hour, the resin undergoes a volume expansion of 65%.

Example 9

15 parts of the alkyd resin prepared from 6 mols diethylene glycol, 5 mols fumaric acid and 1 mol sebacic acid are mixed with 8 parts of styrene and 0.1–1.2 part of lauroyl peroxide. 1 part of potassium carbonate is added, and the polymerizable composition is cured by heating about an hour at 100° C. A volume expansion of 65% is realized.

Example 10

Example 9 is repeated using guanidine carbonate in place of the potassium carbonate. The resin, on curing, undergoes a 36% volume expansion.

Example 11

30 parts of butylene glycol maleate, 15 parts of styrene and 0.5 part lauroyl peroxide are mixed. To the mixture is added 0.5 part of ammonium bicarbonate and the resin is cured by heating for an hour at 100° C., during which operation it undergoes a volume expansion of 200%.

Example 12

2 parts of cellulose acetobutyrate are added to 100 parts of the polymerizable composition of Example 1 and the mixture is rolled for 24 hours. The viscosity of the resulting solution measured on a Brookfield Synchro-Lectric single speed (60 R. P. M.) viscosimeter is 18.64 poises.

50 parts of the above thickened solution is admixed with 2.5 parts of ammonium bicarbonate and 0.5% lauroyl peroxide and heated for one hour at 100° C. A uniform, hard foam is obtained which is characterized by a 430% volume increase over a foam from a similar but unthickened resin solution.

Example 13

3.5 parts of powdered ammonium bicarbonate are dispersed in 200 parts of the polymerization composition of Example 1 containing 3.5 parts of lauroyl peroxide.

Heating in a radio frequency field of 10–25 megacycles gives a volume expansion of well over 500%. The cured, very porous, fairly hard foam has a density of 0.082–0.089 g./cc.

Example 14

954 parts (9 mols) of diethylene glycol, 870 parts (7.5 mols) of fumaric acid, and 303 parts (1.5 mols) of sebacic acid are reacted at 170° C. to an acid number of 50. The resin is cooled to 160° C. and 82 parts of cellulose acetobutyrate (to give 3% by weight of resin) and 1.4 parts of p-tertiary butyl catechol are added. The mixture is stirred for 1½ hours until clear and then cooled to 50°–80° C.

916 parts of steam-distilled styrene is added and the solution stirred until it becomes clear. The solution has a viscosity, measured as in Example 12 of 64.5 poises at 25° C.

When foamed with 0.5% lauroyl peroxide and 5 parts of ammonium bicarbonate for every 50 parts of resin solution by heating at 100° C. for an hour, a 633% volume expansion is realized and the casting is hard and very porous.

Among gas-liberating materials which can be used in the process of the present invention are solid diazo compounds such as diazoaminobenzene, diazoaminotoluene, diazodi-isobutyronitrile, diguanylurea salt of diazotized toluidine, other stabilized azo salts, etc., carbon dioxide, carbonates such as ammonium carbonate, potassium carbonate, sodium carbonate, and guanidine carbonate, and bicarbonates such as ammonium bicarbonate and sodium bicarbonate. In general, ammonium bicarbonate has been found to be particularly satisfactory as a foaming agent because it decomposes readily when heated, but other gas-liberating substances may also be used effectively. The particular selection depends somewhat upon the use to which the final product is to be put. For example, in order to obtain a porous, lightweight resin with good electrical characteristics, it is preferable to use a gas-liberating material which leaves no metallic residue upon decomposition. For such purposes, solid carbon dioxide or ammonium bicarbonate are excellent.

The unsaturated alkyd resins used in connection with the present invention should contain a plurality of alpha, beta-enal groups. The simplest members of this group are those produced by the esterification of an alpha, beta-unsaturated organic acid with a polyhydric alcohol.

The preferred polyhydric alcohols are those which contain only primary hydroxyl groups since the presence of secondary hydroxyl groups may make it difficult to obtain rapid esterification. The glycols are generally preferable. If colorless resins be desired, it is preferable to use glycols which do not have any oxygen bridges in their structure since the presence of oxygen linkages may lead to the formation of color bodies during the preparation of the resin. By the use of glycols which do not contain oxygen bridges clear colorless resins may be produced. On the other hand, oxygen bridges may be desirable if the resin is going to be exposed to air whereby the surfaces will dry faster.

The particular choice of glycol or other polyhydric alcohol used in preparing the resin is governed mainly by the physical properties desired of the intermediate and final polymerization products, especially hardness, impact resistance, distensibility, refractive index, adhesion, compatibility relationships, etc. including also solvent, water, alkali, acid or chemical resistance in general.

The alpha, beta unsaturated organic acids which we prefer to use in preparing the reactive resins include maleic, fumaric, itaconic and citraconic although other similar acids could be substituted such as mesaconic acid, aconitic acid and halogenated maleic acids such as chlormaleic acid and any of the foregoing could be substituted in part with acrylic, beta benzoylacrylic, methacrylic, $\Delta^1$-cyclohexane carboxylic, cinnamic, and crotonic acids. Obviously various mixtures of these acids can be used where expedient.

The reactive resins may be modified with other substances which are used in alkyd resins i. e. monohydric alcohols, monobasic acids or dibasic acids e. g. phthalic acid, sebacic acid, etc., which do not contain groups polymerizably reactive with respect to organic substances containing $CH_2=C<$ groups. These modifying agents are usually used as diluents or plasticizers, chemically combined with the resin.

The reactive resins may be prepared from polyhydric alcohols other than the glycols or from mixtures including a glycol and a higher polyhydric alcohol. Examples of these are glycerol, pentaerythritol, etc. Polyhydric alcohols containing more than two hydroxyl groups react very readily with the alpha, beta unsaturated organic acids. Consequently it may be preferable to use some monohydric alcohol in conjunction with the alcohols which contain more than two hydroxyl groups or else some monobasic acid may be used.

It is also possible to introduce initially into the resin structure a certain number of groupings of the type $CH_2=C<$ through the use of unsaturated alkyl compounds. One way of accomplishing this, for example, is by direct esterification of an unsaturated alcohol containing a $CH_2=C<$ group. Examples of such alcohols are allyl alcohol and methallyl alcohol.

While the reactive resins may be modified in the same general manner as other alkyd resins, it is preferable to have at least 20% polyhydric alcohol in the reactive mixture and at least 25% polybasic acid in said reactive mixture. If a monohydric alcohol or a dibasic acid which does not contain polymerizably active groups with respect to organic substances containing $CH_2=C<$ groups be used, the proportion of such substances will depend on the properties required of the polymerized reactive solvent-reactive resin mixture. By the use of a relatively large proportion of a polymerizably active dibasic acid, e. g. maleic, in the reactive resin, a hard, tough polymer is produced upon subsequent reaction of said reactive resin with a reactive solvent. On the other hand, if the reactive resin is obtained from a relatively small proportion of polymerizably active dibasic acid and a relatively large proportion of acids which do not contain groups polymerizable active with respect to organic substances containing $CH_2=C<$ groups, a softer and more rubbery resin results upon polymerization with a reactive solvent. The same effect is produced by the introduction of other inactive ingredients. By varying the ingredients and the proportions of the ingredients, resins may be obtained having properties desirable for almost any particular use.

If it be desirable to introduce lower alkyl groups into the resin, this may be done by using maleic esters of monohydric alcohols, e. g. ethyl maleate. The alkyl ester will then be united with the resin by polymerization. This could not be accomplished with the saturated type of alkyd, e. g. phthalic acid esters of polyhydric alcohols.

Among the liquids having a boiling point of at least 100° C. and containing a $CH_2=C<$ group which are suitable for use according to the present invention are styrene, alkyl substituted styrenes such as the methyl styrenes, i. e., α-methyl styrene, o-, m-, and p-methyl styrenes, the dimethyl styrenes, i. e., α-p-dimethyl styrene, 2,3-, 2,4-, 2,5- and 2-6-dimethyl styrenes the trimethyl styrenes, i. e., α-methyl-2,4-dimethyl styrene, α-methyl-2,5-dimethyl styrene, α-methyl-2,3-dimethyl styrene, the ethyl styrenes, the methyl ethyl styrenes, the isopropyl styrenes, etc., the chlorostyrenes, i. e., o-, m- and p-chlorostyrenes, 2,3-and 2,5-dichlorostyrenes, chloromethyl styrenes, and the like.

Also useful are suitable vinyl esters and suitable esters of acrylic acid and methacrylic acid as well as allyl esters such as diallyl fumarate, diallyl maleate, diallyl phthalate, diallyl succinate, allyl acetate, allyl lactate, the allyl ester of α-hydroxyisobutyric acid, diallyl malonate, diallyl carbonate, diallyl oxalate, diallyl adipate, diallyl sebacate, diallyl itaconate, triallyl tricarballylate, triallyl citrate, triallyl phosphate, tetrallyl silicate, allyl alcohol, methallyl alcohol, etc.

The polymerization catalysts which may be used in conjunction with the mixture of unsaturated alkyd resin and liquid containing a $CH_2=C<$ group include the organic superoxides, aldehydic and acidic peroxides. Among the preferred catalysts are: the acidic peroxides, e. g., benzoyl peroxide, phthalic peroxide, succinic peroxide and benzoyl acetic peroxide; fatty oil acid peroxides, e. g. coconut oil acid peroxides, stearic peroxide and oleic peroxide; alcohol peroxides, e. g. tetrtiary butyl hydroperoxide; and di-tertiary butyl peroxide; and terpene oxides, e. g. ascaridole. Other polymerization catalysts such as soluble cobalt salts (particularly the linoleate and naphthenate), p-toluene sulfonic acid, aluminum chloride, stannic chloride, boron trifluoride, etc., may also be used.

The concentration of catalyst employed is usually small, i. e., for the preferred catalysts from about one part of catalyst per thousand parts of the polymerizable mixture to about two parts of catalyst per hundred parts of the mixture. If an inhibitor be present, up to 5% or even more of catalyst may be necessary according to the concentration of inhibitor.

When it is advisable either to stabilize the polymerizable mixture against storage or to control an extremely rapid polymerization, a polymerization inhibitor is included in the reaction mixture. This inhibitor is preferably a phenolic compound, especially of di- and polyhydroxy phenols, or an aromatic amine such as hydroquinone, resorcinol, tertiary butyl catechol, tannin, sym. alpha, beta-naphthyl-p-phenylene diamine, phenolic resins, etc. Sulfur compounds are also suitable as are benzaldehyde and 1-ascorbic acid.

The particular unsaturated alkyd resin, liquid having a boiling point of at least 100° C. and containing a $CH_2=C<$ group, polymerization catalyst and polymerization inhibitor to be used are selected according to the type of product desired, taking into account the solubilities of the reactants as well as the character of the resulting gels. Some combinations, for instance, result in opaque gels while others give clear products in the gel state. Obviously, an opaque gel may be used equally as well as a clear gel for many purposes.

Various solid materials may be introduced into the resinous solution of the present invention before the porous structure is made. In order to increase the viscosity of the resin solution by so-called "mechanical" means, short fibrous materials such as asbestos, wood flour, glass, cotton, mica, scrap cork, etc., may be incorporated in the solution. Organic materials such as cellulose acetobutyrate, polybutyl acrylate, polyvinyl acetate, nitrocellulose, and the like which become dispersed in the resin and form solutions of high viscosity may also be used.

We prefer, for the practice of the present invention, to incorporate from 1–3% by weight, based on the combined weight of the unsaturated alkyd resin and the copolymerizable liquid, of cellulose acetobutyrate in the resin solution since this material forms solutions of extremely high viscosity which produce foams of outstanding characteristics. That cellulose acetobutyrate exerts a spectacular, specific effect on resin solutions used in the preparation of foamed, porous resins in accordance with the present invention will be readily seen from the following comparative examples.

*Comparative Example 1*

Diethylene glycol, fumaric acid and sebacic acid in the molar ratio of 6:5:1, respectively, is heated together to produce a resin having an acid number of about 50 or less. Two parts by weight of this resin are mixed with one part by weight of styrene.

To 100 gram portions of the homogeneous mixture prepared as described above are added two grams of each of a large number of thermoplastic resinous polymers or copolymers. Each mixture is rolled for 24 hours, the solution is then strained, and the viscosity thereof is determined at room temperature using a Brookfield Synchro-Lectric single speed (60 R. P. M.) viscosimeter. The following table gives the determined viscosities for the various combinations:

| Polymer or Copolymer Added (2 g. to 100 g. mixture) | Viscosity of Final Solution (poises) |
|---|---|
| Polystyrene | 2.62 |
| Alpha Methyl Styrene Polymer | 2.74 |
| Dimethyl Styrene Polymer | 2.70 |
| Polydichlorostyrene | 2.84 |
| Polyacrylamide | 2.58 |
| Polyethyl Acrylate | 2.62 |
| Polybutyl Acrylate | 4.70 |
| Polymethyl Methacrylate | 2.76 |
| Polyisobutyl Methacrylate | 2.96 |
| Cellulose Acetate | 2.52 |
| Cellulose Acetobutyrate | 18.64 |
| Ethyl Cellulose | 2.74 |
| Nitrocellulose | 4.80 |
| Polyvinyl Acetate | 5.70 |
| Polyvinyl Alcohol | 2.40 |
| Polyvinyl Acetal | 3.50 |
| Polyvinyl Butyral | 2.54 |
| Polyvinyl Chloride | 2.72 |
| Polyvinyl Chloride-Acetate | 2.60 |
| Styrene-Ethyl Acrylate Copolymer | 2.74 |
| Styrene-Butyl Acrylate Copolymer | 2.60 |
| Ethyl Acrylate-Acrylamide Copolymer | 2.78 |
| Dimethyl Styrene-Acrylonitrile Copolymer | 2.74 |
| Alpha-Methyl Styrene-Dimethyl Styrene Copolymer | 2.76 |

Thus, it is apparent that cellulose acetobutyrate, when admixed with a copolymerizable composition including an unsaturated alkyd resin and styrene, gives an especially marked increase in viscosity of the solution.

*Comparative Example 2*

50 gram portions of the strained solutions containing cellulose acetobutyrate, polyvinyl acetate and polybutyl acrylate prepared in Comparative Example 1 are foamed in an oven at 100° C. for one hour using 2.5 grams of ammonium bicarbonate as a solid gas-liberating substance and 0.5% lauryl peroxide as the polymerization catalyst. A corresponding sample of the resinous mixture of diethylene glycol-fumarate-sebacate and styrene is prepared containing no viscosity modifying agent and is foamed according to the same procedure used with the three more viscous solutions. The results of the foamings are shown in the following table:

| Resin Solution | Viscosity | Percent Volume Increase |
|---|---|---|
| Resin Alperox (lauryl peroxide) $NH_4HCO_3$ | 2.50 | 272 |
| Resin Cellulose Acetobutyrate Alperox (lauryl peroxide) $NH_4HCO_3$ | 18.64 | 430 |
| Resin Polyvinyl Acetate Alperox (lauryl peroxide) $NH_4HCO_3$ | 5.70 | 157 |
| Resin Polybutyl Acrylate Alperox (lauryl peroxide) $NH_4HCO_3$ | 4.70 | 358 |

Cellulose acetobutyrate is not only strikingly superior to polyvinyl acetate and to polybutyl acrylate as a viscosity modifying agent but the per cent volume increase in a resin solution containing cellulose acetobutyrate is greatest when resinous foams are prepared.

Cellulose acetobutyrates suitable for use in the preparation of our foamed resins are, in general, those which have an acetyl content of from about 5–15% and a butyryl content from 30–50%. The cellulose acetobutyrate used in the examples and comparative examples has a butyryl content of 36.5%, an acetyl content of 13.5% and a viscosity of 30 centipoises. The viscosities of these materials will normally vary anywhere from about 10 to about 300 centipoises. The resin solution containing the cellulose acetobutyrate should have as high a viscosity as possible and, in general, the higher the butyryl content of the cellulose acetobutyrate, the higher the attainable viscosity of the resin solution, other things being equal. The viscosity of the resin solution depends also on other factors, of course, such as the particular alkyd resin involved, its viscosity, etc.

We have also found that the best foamed resins are obtained when the viscosity index of the resin solution, i. e., the rate of decrease in viscosity with increase in temperature, is low. When a resin solution is heated, its viscosity decreases quite rapidly with increasing temperature. When a foaming agent is present, this decrease in viscosity allows the entrapped gas which forms the foam to escape from the mass. Through the introduction of a high molecular weight thermoplastic material into the resin solution, the rate of decrease in viscosity with rise in temperature is decreased. Since the resin solution is more viscous at the elevated temperatures, the gas liberated from the foaming agent is entrapped and does not leave the medium.

In order to increase strength, materials such as fine glass filaments (obtained by hammer-milling) and insoluble, thermoplastic resinous materials in solid or filament form including polymers of isopropenyl toluene, polymers of acrylonitrile, alpha cellulose pulp and the like may be added to the soluble resin composition.

While satisfactory low-density resins are obtained when the polymerizable compositions are foamed at atmospheric pressure, we have found that a larger percentage volume increase takes place when the foaming is carried out under reduced pressure. The advantage of this volume increase is at least partially offset by the increased size of the pores in the resin structure and by the loss of a considerable amount of the liquid containing a $CH_2=C<$ group.

It is possible to prepare, by the process of the present invention, resins of good mechanical, electrical and other characteristics having a density as low as 0.1 gram per cc. of resin. In general, the resins of the invention have densities ranging from 0.1–0.7 gram per cc. of resin.

The expanded, porous, lightweight resins of the present invention have many uses. One important application is in heat and sound insulating material where the resins may be formed in situ or may be used as pre-formed blocks. Fabricated structures in the form of laminates with the resinous compositions of the present invention as fillers have found wide application in the aircraft and other industries interested in fabricated parts embodying both lightness and strength. In such applications the filler must have as low a density as possible but at the same time, sufficient crushing and shear strength to make the whole act as a structural unit. For example, laminates embodying the lightweight resins of the present invention may be used in airplane cabin partitions, trim tabs, wing edges, fuselage panels, and other structural applications.

Another important application of our porous, lightweight fabricated structures is their use in the formation of structural domes suitable for housing high frequency electrical devices such as, for example, radar.

This is a continuation-in-part of our copending application Serial No. 642,391, filed January 19, 1946, now abandoned.

We claim:

1. An expanded, porous, low-density, cellular, cured water-insoluble resin which is the product obtained by subjecting a homogeneous mixture including (1) a polymerizable unsaturated alkyd resin containing a plurality of alpha, beta-enal groups, (2) a compatible copolymerizable liquid having a boiling point of at least 100° C. and a $CH_2=C<$ group, and being selected from the group consisting of styrene, alkyl-substituted styrenes and chlorinated styrenes, (3) from about 1–3% by weight, based on the combined weight of said alkyd resin and said liquid, of cellulose acetobutyrate having an acetyl content of from about 5–15% and a butyryl content of from about 30–50%, and (4) a solid, gas-liberating material, to conditions under which said unsaturated alkyd resin and said copolymerizable liquid copolymerize and said gas-liberating material simultaneously releases a gas.

2. An expanded, porous, low-density, cellular, cured, water-insoluble resin which is the product obtained by subjecting a homogeneous mixture including (1) a polymerizable unsaturated alkyd resin containing a plurality of alpha, beta-enal groups, (2) styrene, (3) from about 1–3% by weight, based on the combined weight of said alkyd resin and said styrene, of cellulose acetobutyrate having an acetyl content of about 5–15% and a butyryl content of from about 30–50%, and (4) a solid, gas-liberating material, to conditions under which said unsaturated alkyd resin and said styrene copolymerize and said gas-liberating material simultaneously releases a gas.

3. A resin in accordance with claim 2 wherein the solid, gas-liberating material is solid carbon dioxide.

4. A resin in accordance with claim 2 wherein the solid, gas-liberating material is a diazo compound.

5. A resin in accordance with claim 2 wherein the solid, gas-liberating material is a bicarbonate.

6. A resin in accordance with claim 2 in which the alkyd resin is diethylene glycol-fumarate-sebacate.

7. A process of preparing an expanded, porous, low-density, cellular, cured, water-insoluble resin which comprises subjecting a homogeneous mixture including (1) a polymerizable unsaturated alkyd resin containing a plurality of alpha, beta-enal groups, (2) a compatible copolymerizable liquid having a boiling point of at least 100° C. and a $CH_2=C<$ group, and being selected from the group consisting of styrene, alkyl-substituted styrenes and chlorinated styrenes, (3) from about 1–3% by weight, based on the combined weight of said alkyd resin and said liquid, of cellulose acetobutyrate having an acetyl content of from about 5–15% and a butyryl content of from about 30–50%, and (4) a solid, gas-liberating material, to conditions under which said unsaturated alkyd resin and said copolymerizable liquid copolymerize and said gas-liberating material simultaneously releases a gas.

8. A process according to claim 7 in which the copolymerization is effected in the presence of a polymerization catalyst.

9. A composition comprising a homogeneous mixture including (1) a polymerizable unsaturated alkyd resin containing a plurality of alpha, beta-enal groups, (2) a compatible copolymerizable liquid having a boiling point of at least 100° C. and a $CH_2=C<$ group, and being selected from the group consisting of styrene, alkyl-substituted styrenes and chlorinated styrenes, (3) from about 1–3% by weight, based on the combined weight of said alkyd resin and said liquid, of cellulose acetobutyrate having an acetyl content of from about 5–15% and a butyryl content of from about 30–50%, and (4) a solid, gas-liberating material, capable of liberating a gas when said homogeneous mixture is subjected to conditions under which there is copolymerization of said unsaturated alkyd resin and said copolymerizable liquid.

10. A composition as in claim 9 in which the copolymerizable liquid is styrene.

EDWARD L. KROPA.
LOUIS E. CRAIG.
ARTHUR S. NYQUIST.

REFERENCES CITED

The following references are of record in the file of this patent:

UNITED STATES PATENTS

| Number | Name | Date |
|---|---|---|
| 2,461,761 | Nye | Feb. 15, 1949 |